United States Patent
Roland

(10) Patent No.: US 10,913,866 B2
(45) Date of Patent: Feb. 9, 2021

(54) COATING COMPOSITION AND PAINT PRODUCED FROM SAME

(71) Applicant: BOLLIG & KEMPER GMBH & CO. KG, Cologne (DE)

(72) Inventor: Jean-Francois Roland, Brie et Angonne (FR)

(73) Assignee: BOLLIG & KEMPER GMBH & CO. KG, Cologne (DE)

( * ) Notice: Subject to any disclaimer, the term of this patent is extended or adjusted under 35 U.S.C. 154(b) by 410 days.

(21) Appl. No.: 15/563,715

(22) PCT Filed: Nov. 9, 2015

(86) PCT No.: PCT/IB2015/058642
§ 371 (c)(1),
(2) Date: Oct. 2, 2017

(87) PCT Pub. No.: WO2016/156953
PCT Pub. Date: Oct. 6, 2016

(65) Prior Publication Data
US 2018/0066141 A1    Mar. 8, 2018

(30) Foreign Application Priority Data
Apr. 2, 2015 (DE) .................... 20 2015 101 656 U

(51) Int. Cl.
*C09D 7/42* (2018.01)
*C08K 3/36* (2006.01)
*C08L 77/00* (2006.01)

(52) U.S. Cl.
CPC . *C09D 7/42* (2018.01); *C08K 3/36* (2013.01)

(58) Field of Classification Search
CPC ... C09D 7/42; C09D 5/00; C08K 3/36; C08K 9/08; C08L 77/00; C08L 61/24; C01B 33/12
See application file for complete search history.

(56) References Cited

U.S. PATENT DOCUMENTS

| 2003/0153643 A1* | 8/2003 | Jin | C08K 3/22 522/81 |
| 2004/0034158 A1* | 2/2004 | Reuter | C09D 127/06 524/567 |

FOREIGN PATENT DOCUMENTS

| EP | 1226976 A1 | 7/2002 |
| EP | 2821446 A1 | 1/2015 |
| WO | WO 2009/101320 A2 | 8/2009 |
| WO | WO 2012/065828 A1 | 5/2012 |

OTHER PUBLICATIONS

International Search Report dated Jan. 25, 2016 issued in PCT/IB2015/058642.

* cited by examiner

*Primary Examiner* — John D Freeman
(74) *Attorney, Agent, or Firm* — Scully Scott Murphy and Presser

(57) ABSTRACT

The invention relates to a coating composition based on organic or water-based solvent, containing at least one binder (A), optionally at least one cross-linking agent (B), and at least one matting agent (M) based on silicon dioxide ($SiO_2$), wherein the coating composition contains a combination of a) a matting agent based on silicon dioxide ($SiO_2$) that is surface-modified with one or more waxes, b) an organic matting agent, and c) polyamide particles, and a clear lacquer comprising a coating composition of this type. In this way, automobile series paints can be produced having targeted, adjustable low gloss.

11 Claims, No Drawings

COATING COMPOSITION AND PAINT PRODUCED FROM SAME

The invention relates to coating compositions for the automotive industry. In particular, the invention relates to coating compositions for producing matt clear coats.

For several years, matte surfaces apart from shining coatings are increasingly desired in the automotive field, for example for automotive coatings in matte silver black or blue colors. Generally, here matte surfaces are achieved by the addition of matting agents to the clear coating. Useful matting agents in clear coat systems can be organic matting agents or inorganic matting agents. Organic matting agents are for example based on rubber and/or waxes. Inorganic matting agents on the basis of silicates are commercially available and used broadly. Silicate-based matting agents on the basis of pyrogenic silicic acid, precipitated silicic acid, or on the basis of silica gel are usable. The matting agents can also be surface modified, where for modification different organic components like hard microcrystalline waxes, plasticizing microcrystalline waxes and/or polyethylene waxes and/or inorganic components, like polysiloxanes, are used.

Matting agents based on silica gel or silicic acid with and without surface modification and their use in coating compositions for the production of coatings for the automotive industry are known. From WO 2012/065828 A1, for example, a coating composition is described on the basis of organic solvents containing at least one hydroxyl group containing compound (A), at least one cross linking agent (B) having groups which are reactive toward hydroxyl groups and at least one matting agent (M) based on silica gel, wherein the matting agent has been surface-modified by means of one or more waxes and the coating composition additionally contains at least one rheological auxiliary based on hydrophobic silica. The matting agent used and its particle size define the matting effect and the smoothnes's of the surface. In the known coating compositions it is, however, in particular, disadvantageous that there are limits of the matting effect to be achieved and that the matting agents often not lead to the desired effect of reducing the degree of gloss.

Therefore, it is the object of the present invention to provide a coating composition that achieves a low degree of gloss in a cross linked coating.

This object is achieved by a coating composition based on an organic solvent or water-based, comprising at least one binder (A), optionally at least one crosslinking agent (B), and at least one matting agent (M) based on silicon dioxide ($SiO_2$), wherein the coating composition comprises a combination of a) a matting agent based on silica ($SiO_2$) surface-modified with one or more waxes, and b) an organic matting agent, and c) polyamide particles.

Surprisingly, it was found that a combination of an inorganic matting agent based on silica ($SiO_2$) surface-modified with wax and an organic matting agent in addition with the use of polyamide particles in a coating composition leads to clear coats with very low gloss numbers. Thus, a gloss number in the range of between 2 and 15 gloss units of a cross linked coating with a structure in a range of between 30 μm and 60 μm were achieved.

With the coating composition according to the present invention it is possible to precisely adjust low and middle gloss effects even for multi layered coatings. The coating composition according to the invention is usable for clear coats with low gloss of opaque, mezallic, or pearly shades. Especially in the field of esthetically demanding automotive coatings it is of special advantage when coatings are obtained that can be precisely adjusted in their degree of gloss. A good appearance, adhesion, and durability against chipping of the cross linked coating is achieved with a single cross linking step within two and three layer coating procedures, like for example two coat one bake or three coat one bake methods. The components of the coating composition allow for the use in 1K, 2K, solvent containing and water-based coatings. Further, the coating compositions of the present invention do not need special requirements for their application but are usable in standard processes of coating applications in the automotive coating.

Suitable matting agents based on silicon dioxide ($SiO_2$) are preferably matting agents based on silicic acid, especially pyrogenic silicic acid or precipitated silicic acid or silica gel based. In preferred embodiments the matting agent based on silicon dioxide ($SiO_2$) is a matting agent based on silicic acid, especially based on precipitated silicic acid. However, other matting agents based on silica gel can also be used.

The matting agents are surface-modified with one or more waxes. Within the meaning of the present invention for the term "wax" all naturally and artificially obtained substances are included which have the following properties: 1. at 20° C. kneadable, solid to brittle hard; 2. Coarse to fine crystalline, translucent to opaque, but not glass-like; 3. over 40° C. melting without decomposition; 4. early above the melting point relatively low viscosity; 5. Highly temperature dependent in consistency and solubility; 6. easily polishable under pressure. If a substance does not meet more than one of these properties, it not a "Wax" in the meaning of the present invention. The waxes can be modified or unmodified. Suitable are all known and customary waxes, whereby preferably synthetic waxes are used. The waxes have usually a number average molecular weight between 100 and 10,000, preferably between 300 and 1,200 and preferred dropping points between 50 and 180° C., especially between 60 and 120° C.

Preferably, matting agents (M) based on silicic acid are used that are modified with one or more different, optionally modified, polyolefin waxes, like polyethylene and polypropylene waxes, polyehtylene glycol waxes. Especially preferred matting agents (M) based on silicic acid are used that are modified with one or more, different, polyolefin waxes, particularly with one or more, different, linear unbranched polyolefin waxes and very especially preferred with one or more different polyehtylene waxes. The amount of wax can be between 3 and 20 weight-%, preferred between 5 and 15 weight-%, each based on the total weight of the matting agent.

The matting agents based on silicon dioxide ($SiO_2$) used in the coating composition can have an average particle size in the range between ≥4 μm and ≤7 μm. The average particle size is given as so-called d50 value (i.e. that 50 volume percent of the particles have a particle size below the given average particle size) and is determined according to the norm for laser diffraction measurement ISO 13320-1. Suitable matting agents based on silicic acid with wax after-treatment are commercially available from Degussa AG under the name Acematt® OK 412, with a d50 value (determined by laser diffraction according to ISO 13320-1) of 6.0 μm or Acematt® OK 607, a finely divided precipitated silicic acid with a d50 value (determined by laser diffraction according to ISO 13320-1) of from 4.4 to 4.5 μm. Finely powdered matting agents enable the use in applications for coatings where small dry film layers should be applied or especially smooth surfaces should be realized.

In preferred embodiments of the coating composition the matting agent based on silicon dioxide ($SiO_2$) is contained in a range of between ≥1 weight-% and ≤5 weight-%, based on the total weight of the coating composition.

Further, the coating composition contains an organic matting agent, preferred on the basis of a urea-oxomethane-polymer. Urea-oxomethane-polymers develop particularly thermosetting plastics. In preferred embodiments the organic matting agent based on a urea-oxomethane-polymer is a methylen-diaminoethylether-polycondensate. The matting agents based on a urea-oxomethane-polymer can have an average particle size in the range of from ≥5 µm to ≤7 µm, given as d50 value. Such organic matting agents are, for example, commercially available from Deuteron GmbH under the trademark Deuteron® MK. They are usable as matting agents for water-based and solvent containing coating systems. In preferred embodiments the coating composition contains the organic matting agent based on urea-oxomethane-polymer in a range of from ≥1 weight-% to ≤7 weight-%, based on the total weight of the coating composition.

Further, the coating composition contains polyamide particles. Preferred polyamide particles are optical transparent polyamides. Suitable polyamides (PA) can be polycondensation products of diamines and dicarboxylic acis, e.g. adipic acid and hexamethylenediamine, or of amino acids, e.g. amino undecane acid, or produced by ring opening polymerisation of lactames, e.g. caprolactame or lauric lactam. Usable are, for example, micro crystalline polyamides containing linear aliphatic dicarboxyl acids and cycloaliphatic diamines, amorphous polyamides containing linear aliphatic dicarboxylic acids and cycloaliphatic diamines and optionally lactames or aminocarboxylic acid, amorphous polyamides containing therephthalic acid and cycloaliphatic or branched aliphatic diamines and optional lactames or aminocarboxylic acids or amorphous polyamides containing iosphthalic acid and cycloaliphatic or linear or branched aliphatic diamines and optionally lactames or aminocarboxylic acids. Suitable optically transparent polyamindes are for example amides from dodecan dicarboxylic acid and a mix of isomers of 2,2,4- and 2,4,4-trimethylhexamethylene diamine, from dodecane dicarboxylic acid and the mix of isomers of 3-, 3-dimethyl-4,4-bis(aminocyclohexyl)-methane, from lauric lactam, isophthalic acid and the mix of isomers of 3-, 3-dimethyl-4,4-bis(aminocyclohexyl)-methane.

The polyamide particles can have an average particle size in the range of from ≥20 µm to ≤60 µm, given as so-called d50 value. Preferred the polyamide particles have an average particle size in the range of from ≥40 µm to ≤46 µm, or ≥43 µm to ≤55 µm, given as so-called d50 value. Such optically transparent polyamides are, for example, commercially available under the trademark Rilsan®, especially Rilsan® D50 and Rilsan® D60 of the firm Arkema, France. In preferred embodiments the coating composition contains the polyamide particles in a range of from ≥3 weight-% to ≤12 weight-%, based on the total weight of the coating composition.

The coating composition contains at least one binder (A) and optionally at least one crosslinking agent (B). Professionally the curing with heat and actinic radiation is also called dual-cure, for short.

The binder can be curable physically, thermally or thermally and with actinic radiation.

The binder can be physically curable. For the purposes of the present invention the term "physical curing" denotes the curing of a mixture, especially of a coating material, by filming as a result of loss of solvent from the mixture, with linking within the resulting thermoplastic material, particularly the coating, taking place via looping of the polymer molecules of the binders (regarding the term cf. Römpp Lexikon Lacke and Druckfarben, Georg Thieme Verlag, Stuttgart, N.Y., 1998, "Binders", pages 73 and 74). Or else filming takes place via the coalescence of binder particles (cf. Römpp Lexikon Lacke and Druckfarben, Georg Thieme Verlag, Stuttgart, N.Y., 1998, "Curing", pages 274 and 275). Usually, no crosslinking agents are necessary for this. Optionally, the physical curing can be assisted by air oxygen, heat, or radiation with actinic radiation.

The binder can be thermally curable. Here, the binder can be external crosslinking or self-crosslinking, especially external crosslinking. In the context of the present invention, the term "self-crosslinking" refers to the property of a binder of undergoing crosslinking reactions with itself. A prerequisite for this is that the binders already contain both kinds of complementary reactive functional groups which are necessary for crosslinking, or that he binder contains reactive functional groups that can react "with themselves". As externally crosslinking, on the other hand, are such binders referred to wherein one kind of the complementary reactive functional groups is present in the binder and the other kind is present in a curing agent or crosslinking agent. For further details of this, reference is made to Römpp, op. cit., "curing", pages 274 to 276, especially the bottom of page 275. The binder of the coating composition can be an oligomeric or polymeric substance. As oligomers such substances are meant that contain at least 2 to 15 repeating monomer units. In the context of the present invention as polymers such substances are meant that contain at least 10 repeating monomer units. For further details reference is made to Römpp, Lexikon Lacke and Druckfarben, Georg Thieme Verlag, Stuttgart, N.Y., 1998, "Oligomers", page 425. Examples for suitable binders are for example statistically alternating and/or block like built linear and/or branched and/or comb like structured (co)polymerisates of ethylenically unsaturated monomers, or polyaddition resins and/or polycondensation resins. For further details about these terms reference is made to Römpp, Lexikon Lacke and Druckfarben, Georg Thieme Verlag, Stuttgart, N.Y., 1998, "Polyaddition" and "Polyaddition resins (Polyadducts)", page 457, as well as "Polycondensates", "Polycondensation" and "Polycondensation resins" pages 463 and 464, as well as to "binders" pages 73 and 74.

Examples of suitable (co)polymerisates are (meth)acrylate(co)polymerisates or partially saponified polyvinyl ester, especially (meth)acrylcopolymerisates, preferably polyurethane-modified (meth)acrylatcopolymerisates.

Examples for suitable polyaddition resins and/or polycondensation resins are polyester, alkyds, polyurethanes, polylactones, polycarbonates, polyether, epoxide resins, epoxide resins amine adducts, poly urea; polyamides, polyimides, polyester-polyurethanes, polyether-polyurethanes, or polyester-polyether-polyurethanes, especially polyester and polyurethanes.

Preferred, such binders are usable that contain carboxylic groups and favorably have an acid number from 10 to 100 mg KOH/g binder, more favorably from 40 to 80 mg KOH/g binder. It is further preferred that these binders have a molecular weight from 500 to 5,000 g/mol. Further preferred are binders usable that contain urethane groups and/or urea groups.

In a preferred embodiment of the coating composition the binder is chosen from the group comprising polyacrylates, polyurethanes, polycarbonates, polyester, nitrocellulose, alkyd, aminoplast, polyepoxides, polyvinyl, polyisocyanates, and their mixtures.

As solvents for the coating composition especially such solvents are suitable that are chemically inert against the components (A) and (B) in the coating composition and that do not react with (A) and (B) even when the coating composition is cured. Examples for such solvents are aprotic solvents, like for example aliphatic and/or aromatic hydrocarbons like toluene, xylene, solvent naphtha, Solvesso 100, or Hydrosol® (of ARAL), ketones, like acetone, methyl ketone, or methyl amyl ketone, ester, like ethyl acetate, butyl acetate, pentyl acetate, or ethyl ethoxy propionate, ether, or mixtures of the said solvents.

Apart from the binder (A), crosslinking agent (B), matting agent (M) based on silicon dioxide ($SiO_2$) and based on a urea oxomethane-polymer and the polyamide particles the coating composition can contain further binders and/or crosslinking agents, as well as common and known coating additives like catalytic agents, light absorbent agents like HALS substances, adhesion promoters, leveling agents, film building agents, rheology steering additives, flame retardants, pigments and/or fillers in effective quantities.

A further subject of the present invention relates to a coating produced by curing of a coating composition according to the invention. In some embodiments the cured coating has a layer thickness in a range of from ≥45 µm to 60 µm. Here, it is especially preferred that the layer thickness of the cured coating is lower than the structuring.

Advantageously, by this coating systems with a very low gloss number can be achieved which nonetheless give the car body a new and elegant appearance.

The coatings made from the coating composition show even on already cured electro dip coatings, primer coatings, base coatings, or common and known clear coatings a good appearance, exceptional adhesion and low chipping. Thus, they are suitable to be used not only in automotive coating (OEM) but also in automotive repair coating.

The application can be carried out by common application methods like for example spraying, blade coating, painting, pouring, dipping, soaking, dripping, or rolling, but especially by spray coating methods. The thermoset curing of the coating composition does not have methodical particularities, but is carried out by know methods like heating in a circulating air oven or by radiation with IR lamps. The coating composition leads to coatings with very good optical qualities when the curing is carried out at low temperatures like they are used in the field of automotive coating, especially also in two and three coat coating methods with only one curing step.

A further subject of the invention relates to a clear coating for the automotive, commercial vehicle, and/or repair coating and/or for the coating of body interior and/or exterior parts, prepared by coating with a coating composition according to the invention. In some embodiments the clear coating has a layer thickness in a range of from >45 µm to <60 µm. It is hereby especially preferred that the layer thickness of the clear coating is lower than that of the structuring.

The coating compositions provide cured coatings, especially clear coatings, with a matte surface and with surprisingly low gloss number. Like that, a degree of gloss of a cured coating in a range of 2 to 15 gloss units, measured in an angle of 60° with a commonly used gloss meter, with a structuring in a range of 30 µm to 60 µm could be achieved. Here, clear coatings with low gloss are provided for opaque, metallic, or pearlescent shades.

It is thus possible to achieve low and middle gloss effects also in multilayer coatings that can be precisely adjusted. The coating composition according to the invention is therefore particularly suitable for decorative, protective and/or effect giving, highly scratch resistant coatings of bodies of all means of transport, especially motor vehicles, like motor bikes, busses, lorries, or automobiles or parts thereof. Especially, the coating compositions and coatings according to the invention, especially the clear coatings, can be used in the field of technological and esthetic particularly demanding automotive series coating (OEM), as well as in the field of automotive repair coating, especially also in multi-layer coating methods, especially in methods in which to an optionally precoated substrate first a pigmented base coating and then a layer of the inventive coating composition is applied.

Examples that serve the better understanding of the present invention are presented in the following. It is pointed out and understood that the coating compositions contain the usual additives that are used in the formulation of a clear coating composition, and so in the examples only the matting agents contained and polyamide particles can be mentioned.

EXAMPLE 1

A coating composition on the basis of organic solvents or water-based, containing at least one binder (A) and optionally at least one cross linking agent (B), as well as:
a) 1 weight-% to 5 weight-% Acematt® OK 412 (from Degussa)
b) 1 weight-% to 7 weight-% Deutron® MK (Deutron), und
c) 3 weight-% to 12 weight-% Rilsan® D50 (Arkema), each based on the total weight of the coating composition.

After the application and curing of the coating composition a degree of gloss of the so achieved clear coating was measured in the range of 2 to 15 gloss units, measured in an angle of 60° with a usual gloss meter, at a structuring of the surface in the range of between 30 µm and 60 µm. With an application of the resultant clear coating in a layer thickness of 50 µm $R_a$ values ($R_a$ is the arithmetic middle value according to DIN EN ISO 4287:2010) between 10 µm and 30 µm could be measured. With an application of the resultant clear coating in a layer thickness of 35 µm $R_a$ values ($R_a$ is the arithmetic middle value according to DIN EN ISO 4287:2010) between 20 µm and 50 µm were measured.

EXAMPLE 2

A coating composition on the basis of organic solvents or water-based, containing at least one binder (A) and optionally at least one cross linking agent (B), as well as:
a) 1 weight-% to 5 weight-% Acematt® OK 607 (from Degussa)
b) 1 weight-% to 7 weight-% Deutron® MK (Deutron), und
c) 3 weight-% to 12 weight-% Rilsan® D60 (Arkema), each based on the total weight of the coating composition.

After the application and curing of the coating composition a degree of gloss of the so achieved clear coating was measured in the range of 2 to 15 gloss units, measured in an angle of 60° with a usual gloss meter, at a structuring of the surface in the range of between 30 µm and 60 µm. With an application of the resultant clear coating in a layer thickness of 50 µm $R_a$ values ($R_a$ is the arithmetic middle value according to DIN EN ISO 4287:2010) between 10 μm and 30 μm could be measured. With an application of the resultant clear coating in a layer thickness of 35 μm $R_a$ values ($R_a$ is the arithmetic middle value according to DIN EN ISO 4287:2010) between 20 μm and 50 μm were measured.

The invention claimed is:

1. A coating composition based on an organic solvent or water-based solvent, comprising at least one binder (A), optionally, at least one crosslinking agent (B), and a combination of
    a) a matting agent based on silica ($SiO_2$) surface-modified with one or more waxes having a d50 particle size between ≥4 and ≤7 μm, and
    b) an organic matting agent, and
    c) polyamide particles having a d50 particle size between ≥20 and ≤60 μm.

2. The coating composition according to claim 1, wherein the matting agent based on silica ($SiO_2$) surface-modified with one or more waxes is a matting agent based on silicic acid.

3. The coating composition according to claim 1, wherein the coating composition contains the matting agent based on silica ($SiO_2$) surface-modified with one or more waxes in a range between ≥1 weight-% and ≤5 weight-%, based on the total weight of the coating composition.

4. The coating composition according to claim 1, wherein the organic matting agent is a matting agent based on a urea-oxomethane polymer.

5. The coating composition according to claim 4, wherein the coating composition contains the organic matting agent based on the urea-oxomethane-polymer in a range of between ≥1 weight-% and ≤7 weight-%, based on the total weight of the coating composition.

6. The coating composition according to claim 1, wherein the coating composition contains the polyamide particles in a range of between ≥3 weight-% and ≤12 weight-%, based on the total weight of the coating composition.

7. An article comprising a coating applied to an automotive vehicle, wherein the coating is a crosslinked coating of the coating composition according to claim 1.

8. The article according to claim 7, wherein the crosslinked coating has a layer thickness in a range of between ≥45 μm and ≤60 μm.

9. The coating composition according to claim 4, wherein said organic matting agent based on the urea-oxomethane polymer is methylene-diaminomethylether-polycondensate.

10. An article comprising a clear coating applied to an automotive vehicle wherein the coating is the coating composition according to claim 1.

11. A method for coating an automotive vehicle comprising applying the coating composition of claim 1 to said vehicle.

* * * * *